(12) United States Patent
 Khay-Ibbat et al.

(10) Patent No.: US 10,050,761 B2
(45) Date of Patent: Aug. 14, 2018

(54) SYSTEM AND METHOD FOR USER EQUIPMENT INITIATED MANAGEMENT OF CARRIER AGGREGATION

(71) Applicant: APPLE INC., Cupertino, CA (US)

(72) Inventors: Samy Khay-Ibbat, San Francisco, CA (US); Tarik Tabet, San Jose, CA (US); Sarma V. Vangala, Campbell, CA (US); Swaminathan Balakrishnan, San Jose, CA (US); Rafael L. Rivera-Barreto, Santa Clara, CA (US); Sree Ram Kodali, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/273,369

(22) Filed: Sep. 22, 2016

(65) Prior Publication Data

US 2017/0012758 A1   Jan. 12, 2017

Related U.S. Application Data

(63) Continuation of application No. 14/503,230, filed on Sep. 30, 2014, now Pat. No. 9,479,315.

(60) Provisional application No. 61/916,742, filed on Dec. 16, 2013.

(51) Int. Cl.
| | |
|---|---|
| *H04W 76/28* | (2018.01) |
| *H04W 84/04* | (2009.01) |
| *H04W 88/02* | (2009.01) |
| *H04L 5/00* | (2006.01) |
| *H04W 72/12* | (2009.01) |

(52) U.S. Cl.
CPC ............ *H04L 5/0057* (2013.01); *H04L 5/001* (2013.01); *H04W 72/1268* (2013.01); *H04W 76/28* (2018.02); *H04W 84/042* (2013.01); *H04W 88/02* (2013.01)

(58) Field of Classification Search
CPC ... H04W 52/34; H04W 52/30; H04W 52/346; H04W 52/367; H04W 52/54; H04W 72/0406; H04W 76/025; H04L 5/006; H04L 5/0094; H04L 5/0098
See application file for complete search history.

(56) References Cited

U.S. PATENT DOCUMENTS

| | | | | |
|---|---|---|---|---|
| 2006/0111115 | A1* | 5/2006 | Marin | H04W 36/14 455/442 |
| 2013/0201834 | A1* | 8/2013 | Klingenbrunn | H04W 28/12 370/236 |

* cited by examiner

*Primary Examiner* — Ayaz Sheikh
*Assistant Examiner* — Debebe Asefa
(74) *Attorney, Agent, or Firm* — Fay Kaplun & Marcin, LLP (57) ABSTRACT

Methods that are performed by a user equipment (UE) and corresponding methods of base stations that allow a UE to determine whether the UE is in a carrier aggregation enabled or disabled state. One exemplary embodiment of a method performed by a UE determines a first artificial value for a first parameter and a second artificial value for a power headroom (PHR) for a secondary component carrier (SCC), the first and second artificial values being substantially low relative to a configuration of the network, generates an artificial report including the first and second artificial values, transmits the artificial report to a primary cell providing a primary component carrier (PCC) and receives an indication that the UE is placed in a carrier aggregation disabled state.

20 Claims, 4 Drawing Sheets

SYSTEM AND METHOD FOR USER EQUIPMENT INITIATED MANAGEMENT OF CARRIER AGGREGATION

PRIORITY CLAIM/INCORPORATION BY REFERENCE

This application claims priority to U.S. Provisional Application 61/916,742 entitled "System and Method for User Equipment Initiated Management of Carrier Aggregation," filed on Dec. 16, 2013, the entirety of which is incorporated herein by reference.

BACKGROUND

Long-term evolution ("LTE") is a wireless communication standard used for high-speed data exchange for mobile devices and data terminals. LTE-Advanced is a major enhancement to the LTE standard. Within the LTE-Advanced standard, carrier aggregation is used to increase the bandwidth, and thereby increase the bitrates. Carrier aggregation has been introduced in the 3rd Generation Partnership Project ("3GPP") Release 10 (LIE-Advanced standard) to provide wider than 20 MHz transmission bandwidth to a single device (e.g., user equipment or "UE") while maintaining the backward compatibility with legacy UEs. Specifically, carrier aggregation may be defined as the aggregation of two or more component carriers in order to support wider transmission bandwidths. Carrier aggregation configuration may be defined as a combination of carrier aggregation operating bands, each supporting a carrier aggregation bandwidth class by a UE. The bandwidth class may be defined by the aggregated transmission bandwidth configuration and maximum number of component carriers supported by a UE. Thus, a UE may indicate a capability of performing the carrier aggregation functionality to a network component that assigns the carrier aggregation configuration thereto.

SUMMARY

In one exemplary embodiment, a user equipment (UE) configured to perform carrier aggregation with a network performs a method. The method includes determining a first artificial value for a first parameter and a second artificial value for a power headroom (PHR) for a secondary component carrier (SCC), the first and second artificial values being substantially low relative to a configuration of the network, generating an artificial report including the first and second artificial values, transmitting the artificial report to a primary cell providing a primary component carrier (PCC) and receiving an indication that the UE is placed in a carrier aggregation disabled state In another exemplary embodiment, a user equipment (UE) configured to perform carrier aggregation with a network performs a method. The method includes determining, when the UE is in a carrier aggregation enabled state, that a primary component carrier (PCC) used in a carrier aggregation configuration for a network is greater than a quality threshold and that a data exchange requirement for the UE is below a transmission threshold, setting an artificial channel quality indicator (CQI) to zero for each secondary component carrier (SCC) used in the carrier aggregation configuration, transmitting the artificial CQI to one of the network and the corresponding secondary serving cell (SCell) and terminating a monitoring of the SCC.

In another exemplary embodiment, a user equipment (UE) configured to perform carrier aggregation with a network performs a method. The method includes determining that the UE is in a Long Term Evolution (LTE) connected state and has entered a Connected Discontinuous Reception (C-DRX) operation, determining an inactivity time in which no transmissions are performed, determining when an OnDuration of the C-DRX operation and the inactivity time is greater than a predetermined value, determining whether the UE is in an uplink carrier aggregation enabled state or a downlink carrier aggregation enabled state, performing a first action when the UE is in the uplink carrier aggregation enabled state and the OnDuration and the inactivity time is greater than the predetermined value and performing a second action when the UE is in the downlink carrier aggregation enabled state and the OnDuration and the inactivity time is greater than the predetermined value.

DETAILED DESCRIPTION

The exemplary embodiments may be further understood with reference to the following description and the appended drawings, wherein like elements are referred to with the same reference numerals. The exemplary embodiments describe systems and methods for a user equipment (UE) initiated management of enabling and/or disabling carrier aggregation. Carrier aggregation requires additional power consumption for a variety of reasons. Thus, to conserve a limited power supply on the UE, the UE may toggle the carrier aggregation functionality between an enabled state and a disabled state. Specifically, a network component controlling the carrier aggregation functionality may receive an indication from the UE that may constructively disable carrier aggregation. The carrier aggregation, the UE initiated management, the UE, the enabling/disabling, the power consumption, the constructive manner, and related methods will be described in further detail below.

When carrier aggregation is used, there may be a number of serving cells for each of the component carriers. The coverage of the serving cells may differ due to both component carrier frequencies and power planning, which is useful for heterogeneous network planning. A radio resource control ("RRC") connection is handled by one cell, namely the primary serving cell ("PCell"), served by the primary component carrier ("PCC") for uplink ("UL") and downlink ("DL"). Specifically, with the LTE-Advanced network, the PCell may be an Evolved Node B (eNB) which is a hardware network component connected to a mobile network for communicating directly with UEs in a substantially similar manner as base transceiver stations in a GSM network. The other component carriers may be referred to as secondary component carriers ("SCC") for UL and DL, serving the secondary serving cells ("SCells"). The SCCs are added and removed as required, while the PCC is changed at handover. The SCells may also be eNBs. Those skilled in the art will understand that the PCell and SCells are logical constructs allowing for the addition of SCells as needed. The PCell is the main cell that is used for all Radio Resource Control (RRC) signaling and control procedures, while the SCell is considered an augmentation to the PCell.

Because carrier aggregation relates to using at least one SCC, which is additional to using the PCC, the active use of carrier aggregation by the UE may lead to increased power consumption for each SCC. For example, the power consumption of a carrier aggregation disabled UE would be approximately the same power consumption as using the PCC in the carrier aggregation enabled state. However, a carrier aggregation enabled UE may consume this same amount of power, plus further power for each SCC used in the carrier aggregation configuration. Those skilled in the art will understand that further power is required for each SCC for a variety of reasons, for example, the UE must monitor the channels corresponding to the SCC when a DL is to be received.

Carrier aggregation provides an increased transfer rate for data exchange and is very useful when a relatively large amount of data is received. However, when little to no data exchange is occurring, the benefits of carrier aggregation are no longer used but the power consumption effect still remains. Carrier aggregation is determined by the network. The UE only indicates that it is carrier aggregation capable. The UE remains in a carrier aggregation enabled state when the network has provided the carrier aggregation configuration. As will be described in greater detail below, the exemplary system and method may be used such that the UE initiates a process that causes the network to disable carrier aggregation or constructively places the UE in a carrier aggregation disabled state.

It should be noted that with carrier aggregation, the UE may be configured with cross carrier scheduling. When LTE-Advanced carrier aggregation is used, it is necessary to be able to schedule the data across the carriers and to inform the UE of the format of various data being transmitted in each component carrier such as physical downlink shared channel (PDSCH) data. All of this information may be transmitted through the PCC if cross carrier scheduling is enabled. Enabling of the cross carrier scheduling is achieved individually via the RRC signaling on a per component carrier basis or a per terminal basis. When no cross carrier scheduling is arranged, the downlink scheduling assignments are achieved on a per carrier basis. That is, they are valid for the component carrier on which they were transmitted by an infra network vendor. For the uplink, an association is created between one downlink component carrier and an uplink component carrier. In this way, when uplink grants are sent, the UE is aware of which uplink component carrier it applies.

According to the exemplary embodiments, although carrier aggregation is ultimately a determination made by the network, the UE may initiate management of the carrier aggregation functionality. For example, the UE may cause the network to toggle or constructively toggle the carrier aggregation functionality between the enabled or disabled state. Accordingly, an exemplary scenario in which the exemplary embodiments may apply is when a network leaves a UE in a carrier aggregation enabled state even while data exchange is very low or null in DL. The carrier aggregation enabled UE may also not be sending a substantial amount of data in the UL. That is, in the above described scenario, the overall data exchange may be minimal where the benefits of carrier aggregation are not applicable while the power consumption drawback is still in effect. The carrier aggregation enabled UE may also have a good PCC being used. For example, the PCC may have a relatively high RSSI value.

The UE may be aware of its data exchange requirements. For example, the UE is aware of all applications that are being currently executed and a current activity associated with each application. Select applications may require a network connection for data to be exchanged with the network and/or other UEs. The UE may also monitor a data exchange rate for these select applications requiring the network connection. Accordingly, the UE may derive a total data rate being utilized in the UL and the DL. Thus, in one example, the UE may determine that the UE is in the carrier aggregation enabled state, data exchange in DL is low or null, data transmission in UL is also low, and the PCC being used is relatively good.

Given the above criteria, the UE may initiate management of the carrier aggregation functionality. According to the exemplary embodiments, the UE may initiate different processes to manage the carrier aggregation state. In a first example, the UE may transmit artificial reports to the network such as via the eNB acting as the PCell so that the network disables carrier aggregation. In a second example, the UE may transmit artificial indicators that allow the UE to effectively stop using the SCCs, thereby constructively placing the UE in the carrier aggregation disabled state. Through utilizing these manners of managing the carrier aggregation state, the UE is capable of conserving a limited power supply by not being required to perform functionalities associated with carrier aggregation.

According to the first exemplary embodiment, the UE may first determine that carrier aggregation is enabled but the benefit of increased data exchange rate is not required. The UE may communicate with the network (via the eNB) to indicate that the carrier aggregation that is still enabled should be deactivated. Again, the network ultimately determines whether the carrier aggregation is activated or deactivated. However, the UE may initiate the process of deactivating the carrier aggregation and cause the network to do so.

The UE may initiate the process by generating a report that may indicate to the network that carrier aggregation is not required. For example, the report may indicate that the UE has a low Reference Signal Received Power (RSRP) and/or a low Reference Signal Received Quality (RSRQ). Specifically, the RSRP and/or RSRQ may be measured for the SCell(s) in the carrier aggregation configuration. The RSRP may relate to an LTE specific metric that averages radio frequency (RF) power in all reference signals in a passband such that the RSRP measurement bandwidth is equivalent of only a single subcarrier. Accordingly, the RSRP measures a signal power from a specific sector while potentially excluding noise and interference from other sectors, which is in contrast to a Received Signal Strength Indicator (RSSI). A low RSRP value may indicate that the reference signals are being received in a low power. That is, the low RSRP value is indicative that a most recent signal received by the UE may be unreliable. Therefore, the network may be aware of the poor quality of the current configuration relating to the SCells.

The RSRQ may also relate to an LTE specific metric that is derived from the number N of reference bands, the RSRP, and the RSSI. Specifically, a quotient is calculated from taking a product of the N reference bands and the RSRP value divided by the RSSI value. Accordingly, the RSRQ may indicate the portion of pure power of the received signal over an entire E-UTRA power received by the UE. Therefore, a low RSRQ may also indicate that the reference signals are being received in a low power, which may be unreliable. The network may then be aware of the poor quality of the current configuration relating to the SCells.

Although the UE may in actuality measure the RSRP and the RSRQ for the SCells to be in an optimal range or other range that would indicate maintaining carrier aggregation to be enabled, the UE may generate the report in an artificial manner. That is, an artificial report that has the low RSRP and/or low RSRQ is transmitted to the network. The degree of how low these values are to be set in this artificial manner may be determined based upon how the network itself configures these values. It is noted that while the parameters described herein are LTE specific parameters, other types of networks may measure different parameters and these different parameters may be used in the same manner.

The report may also indicate that the UE has a low Power Headroom (PHR) for the SCell(s). The PHR may indicate how much transmission power is left for the UE to use in addition to the power being used by a current transmission. The PHR may be measured as a difference between a maximum transmission power of the UE and a Physical Uplink Shared Channel (PUSCH) power. A positive or high PHR may indicate that the UE still has remaining space under the maximum power, which implies the UE is capable of exchanging more data if required. A zero PHR may indicate that the UE is using the maximum power for transmission. A negative or low PHR may indicate that the UE is already transmitting with a power greater than what is allowed, which implies the UE is incapable of exchanging any more data. The PHR is a type of Media Access Control (MAC) Control Element (CE) that reports the PHR between the current transmission power (estimated power) and the nominal power. The eNB may receive the PHR value to estimate how much uplink bandwidth the UE may use for a specific subframe. With a greater resource block that the UE is using, the higher the transmission power becomes. However, the transmission power should not exceed the max power defined in the specification. Therefore, the UE cannot use much resource block (or bandwidth) if it does not have enough remaining PHR. By indicating a low PHR, the network may be aware of the incapability of the UE for further concurrent transmission using the SCell.

According to the exemplary embodiments, the network or the eNB may receive the PHR value from the UE to determine two thresholds for PHR. A first threshold may be one used to activate or enable carrier aggregation while a second threshold may be one used to deactivate or disable carrier aggregation. Accordingly, the low PHR (as well as the low RSRP/RSRQ) for the SCell(s) that is provided to the eNB may cause the network to disable carrier aggregation and rely only upon the PCC.

The two thresholds defined by the network may be dynamically selected based upon the PHR value provided by the US. Specifically, the determination on whether to update the two thresholds based upon the reported PHR may be based upon the UE monitoring the UL activity and the UL Block Error Rate (BLER). The BLER may be used in LTE to become aware of an in-sync or out-of-sync indication during radio link monitoring (RLM). Therefore, the UE may also provide the UL activity and the UL BLER to the eNB. Accordingly, based upon the PHR value that is provided from the UE to the eNB as well as the UL information, the network may set the two thresholds. The UE may provide the low PHR value to maintain an activity such that the carrier aggregation is disabled and remains disabled until a time when the benefits of carrier aggregation are useful.

In a first specific scenario of the first exemplary embodiment, the UE may have only one UL in the carrier aggregation configuration. With one UL, the low PHR value is determined by the UE and provided to the eNB such that the UE is capable of performing transmission activities between the two threshold values that would be set by the network. In this manner, the carrier aggregation is deactivated and remains deactivated. Since the US has already determined that little to no data is being transmitted in the UL, the artificial report of a low PHR has no substantial effect on the UL performance of the UE. It should be noted that the low PHR value in the artificial report for when there is one UL may be low as defined above (i.e., negative) or may be in a low value within the positive range (e.g., close to zero).

In a second specific scenario of the first exemplary embodiment, the UE may have more than one UL in the carrier aggregation configuration. With multiple ULs, the UE may ensure that carrier aggregation is disabled and remains disabled by providing the low PHR as defined above. That is, the low PHR that is indicated in the artificial report may be a negative value. This is particularly the case when extended PHR is involved in which multiple PHR values mapped to corresponding component carriers are provided simultaneously. Therefore, the low PHR values for the SCell(s) may disable carrier aggregation by the deactivation threshold being set accordingly and the transmission activity of the UE remaining below the activation threshold.

It should be noted that if the UE determines that carrier aggregation may be required, the UE may also transmit an updated report. The updated report may provide actual values for the RSRP, RSRQ, PHR, and UL information. When the network receives these values, the eNB may be prompted to re-activate carrier aggregation for the UE. Regarding the first scenario, the PHR value that is transmitted in the updated report may be above the activation threshold. Regarding the second scenario, the PHR value may be positive and also above the activation threshold.

It should also be noted that in the carrier aggregation disabled state, the UE may still be requested to report path loss. Path loss (or path attenuation) may be a reduction in power density (attenuation) of an electromagnetic wave as it propagates through space. As path loss may be a component in the analysis and design of a link budget in a telecommunication system, path loss may also be used as a criteria for activating/deactivating carrier aggregation for the UE. When UE requires carrier aggregation to be enabled, the path loss may also be reported from the UE to the network in an artificial manner. Specifically, the path loss may be reported with a value offset by a factor depending on a UE desire to have carrier aggregation reactivated.

According to the second exemplary embodiment, the UE may first determine that carrier aggregation is enabled but the benefit of increased data exchange rate is not required. The UE may communicate with the network to constructively disable carrier aggregation on the UE side. That is, the UE may still be in a carrier aggregation enabled state according to the network but does not perform the power consumption functionalities associated with this state such as monitoring of channels of the SCCs.

In a first scenario of the second exemplary embodiment, the UE may also be configured with a cross-carrier scheduling functionality in which cross-carrier scheduling is enabled. The UE may send a Channel Quality Indicator (CQI) for each SCC to the network. At the same time that the CQI is transmitted, the UE may initiate a timer. The timer will be described in detail below. The CQI may measure the quality of the SCC provided by the SCell. A high CQI is indicative of a high quality signal whereas a low CQI is indicative of a low quality signal. The UE may transmit an artificial CQI value corresponding to the SCC to the network. Specifically, a CQI value of zero may be transmitted. When the CQI value is zero, this may indicate to the network that the SCC is unreliable for exchanging data. When the network receives this indication, the network may be caused to remove the SCC from being used. With each SCC being indicated with a CQI value of zero, every SCC may be removed from consideration. Therefore, only the PCC remains for use.

If the network deactivates the SCC prior to the timer expiring, the UE initiated management has constructively placed the UE in the carrier aggregation disabled state since only the PCC is being used for data exchange. As discussed above, the cross-carrier scheduling determines the manner in which data is transmitted between the UE and the network using the PCC and the SCCs. That is, the network determines how data is transmitted over the PCC and the SCCs. With the SCCs being deactivated, the cross-carrier scheduling functionality only relies upon the PCC from being used. Therefore, the UE may terminate monitoring the SCCs as they are no longer being used for the scheduling of data transmissions. Furthermore, the UE may discontinue transmitting the CQI value of zero for the deactivated SCCs.

The timer may be selected as an amount of time in which the UE may still monitor the SCCs if the cross-carrier scheduling has indicated a data transmission. Specifically, the timer may be used as a means to ensure that any scheduling involving the SCCs that may be used may still be addressed by the UE within the timer limit. Thus, if the network deactivates the SCCs prior to the timer expiring, the operations described above results. If the network has not yet deactivated the SCCs from the CQI value as zero being transmitted, the UE may still terminate monitoring the SCC if the cross-carrier scheduling does not utilize the SCC. Until the timer expires, the UE may continue to transmit the CQI value of zero. However, if the UE detects from the cross-carrier scheduling that is received from the network that there is a grant on the PCC for SCC, the UE may begin to restart monitoring the SCC, particularly on the selected SCC indicated in the cross-carrier scheduling. The impact from this terminating and restarting of the monitoring of the SCC may be that DL data may be missed at L1 (time frame of the cross-carrier scheduling). However, the UE is aware of the missed DL data such that subsequent monitoring of the PDSCH on the SCC may enable receiving a retransmission of the missed DL data (e.g., on a next time frame of the cross-carrier scheduling). That is, the DL data is still received by the UE.

In a second scenario of the second exemplary embodiment, the UE may be configured with cross-carrier scheduling functionality but is disabled or may not be configured with this functionality. The UE may also send a CQI for each SCC. However, since no cross-carrier scheduling is used, the UE may send the CQI of zero to each SCell corresponding to the SCC. When the SCell receives the CQI of zero from the UE, the SCell is aware that data transmissions on its component carrier is unreliable. Therefore, the SCell may terminate transmissions to the UE on its component carrier. Accordingly, the constructive carrier aggregation disabled state may again be achieved. The UE may continue to transmit the CQI of zero until carrier aggregation is required. If carrier aggregation using the SCC is required at a subsequent time, an actual CQI value may be provided that indicates that the component carrier of the SCell is reliable for data transmission.

Figure 1:
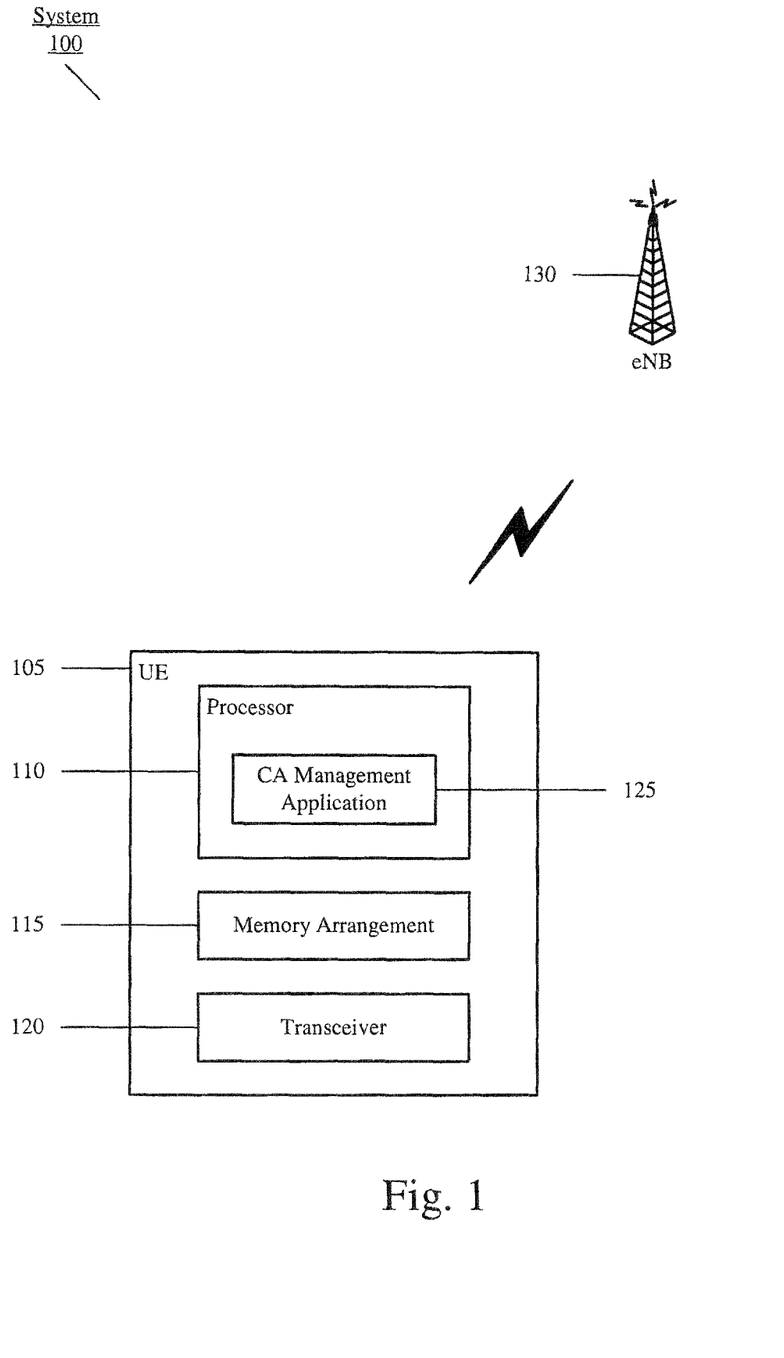
FIG. 1 shows an exemplary system in which a user equipment participates in managing the enabling of carrier aggregation.

FIG. 1 shows an exemplary system 100 in which carrier aggregation may be managed through a UE initiated process. The system 100 includes a UE 105 and an eNB 130. As discussed above, the UE 105 may associate with the eNB 130 to join the network corresponding to the eNB 130 (e.g., LTE network). The UE 105 may also include the carrier aggregation functionality with or without cross-carrier scheduling. As the UE 105 is associated with the eNB 130, the eNB 130 may provide the carrier aggregation configuration for component carriers to be used by the UE 105 in which the eNB 130 may be the Kell and further eNBs (not shown) may be the SCells.

The UE 105 may be any electronic component configured to join a network via the eNB 130. For example, the UE 105 may be a portable device such as a cellular phone, a smartphone, a tablet, a phablet, a laptop, etc. Specifically, the UE 105 may relate to an electronic component that has a limited power supply. As shown in FIG. 1, the UE 105 may include a processor 110, a memory arrangement 115, and a transceiver 120. However, the UE 105 may also include further components such as a display device, an input/output (I/O) device, and other components such as a portable power supply, an audio I/O device, etc.

The processor 110 may be configured to execute a plurality of applications of the UE 105. For example, the applications may include a web browser when connected to a communication network via the transceiver 120. Accordingly, data may be exchanged with the network. More specifically, the data may be exchanged using carrier aggregation to increase a rate in which the data is exchanged. In another example, the applications may include a carrier aggregation management application 125 that performs the UE initiated process to disable or constructively disable carrier aggregation. It should be noted that the carrier aggregation management application 125 being an application (e.g., a program) executed by the processor 110 is only exemplary. The priority application 125 may also be represented as a separate incorporated component of the UE 105 or may be a modular component coupled to the UE 105. In another example, the transceiver 120 may also perform some or all of carrier aggregation management application. In a further example, a separate integrated circuit that may or may not include firmware may perform the functionality of the carrier aggregation management application.

The memory arrangement 115 may be a hardware component configured to store data related to operations performed by the UE 105. Specifically, the memory arrangement 115 may store the artificial values to be used for the UE initiated processes. The memory arrangement 115 may also store the network configuration values for various metrics that are used as a basis of determining the artificial values.

As described above, the UE 105 may be left in the carrier aggregation enabled state but no longer requires the benefits of carrier aggregation, which causes unnecessary power consumption. That is, the DL and UL requirements do not necessitate using carrier aggregation. The UE 105 may also determine that the PCC provides a sufficient bandwidth for purposes of data transmissions in this scenario. When the UE 105 makes these determinations, the carrier aggregation management application 125 may perform the above described manners of UE initiated management.

In the first example, the carrier aggregation management application 125 may generate the reports including the RSRP, RSRQ, PHR, and UL information. Specifically, the carrier aggregation management application 125 determines the artificial values to be transmitted to the network for these parameters. As the artificial values are based upon a network configuration that is stored on the memory arrangement 115, the carrier aggregation management application 125 may calculate these artificial values. Using the transceiver 120, the UE 105 may transmit the report to the network. The network may deactivate carrier aggregation using the thresholds determined from the PHR value that is received from the UE 105.

In the second example, the carrier aggregation management application 125 may generate the artificial CQI of zero for the SCCs. Depending on whether cross-carrier scheduling is enabled or disabled, the carrier aggregation management application 125 may transmit the artificial CQI to the network (when enabled) or to each corresponding SCell (when disabled). The carrier aggregation management application 125 may then indicate to the UE 105 that the UE 105 may terminate monitoring the SCCs.

Figure 2:
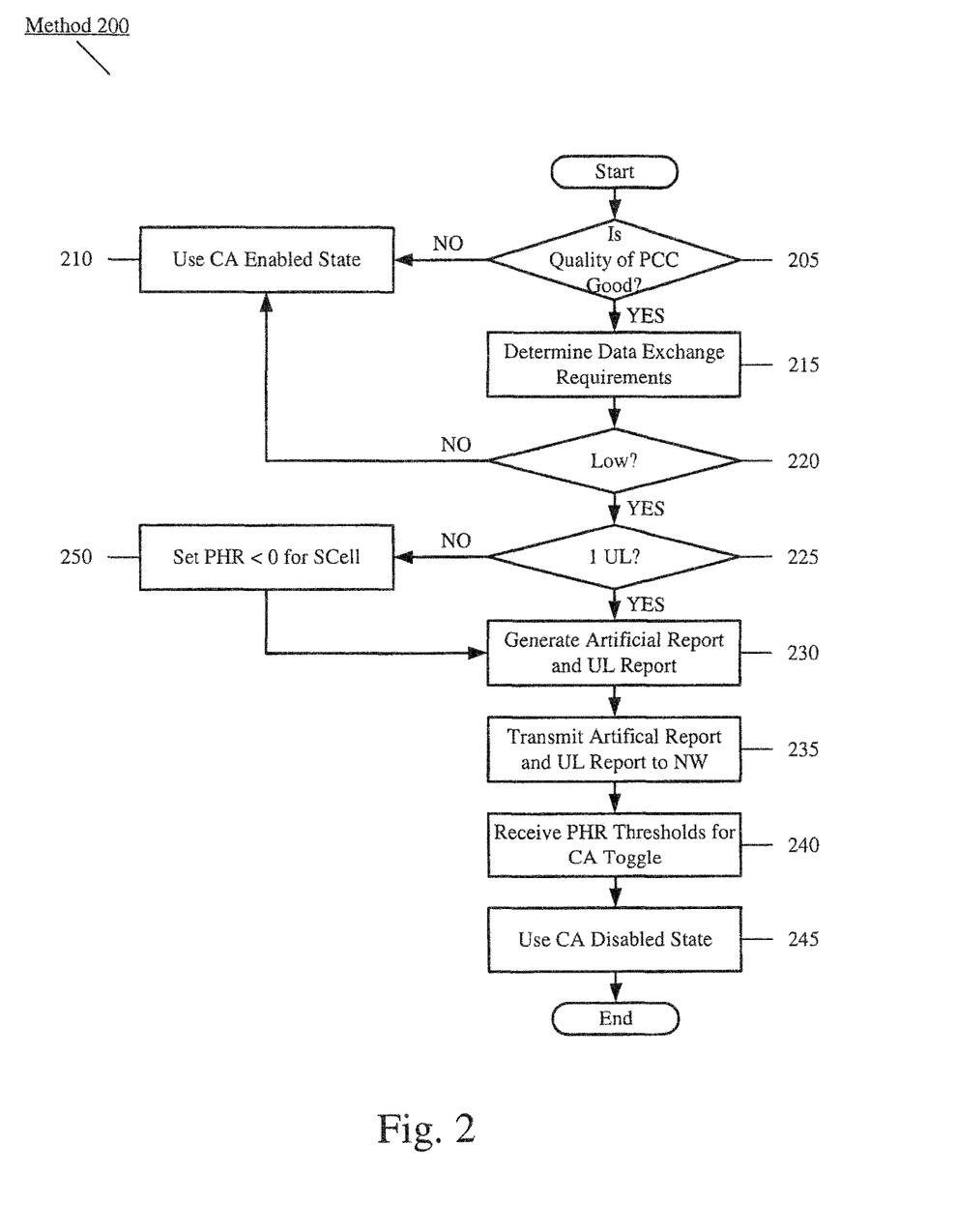
FIG. 2 shows a first exemplary method for a user equipment initiated management of enabling and disabling carrier aggregation.

FIG. 2 shows a first exemplary method 200 for a UE initiated management of enabling and disabling carrier aggregation. In step 205, the carrier aggregation management application 125 determines whether a quality of the PCC is good. The quality of the PCC may be determined using any manner such as using a RSSI value. While the term good may be considered a relative term, a good quality of the PCC may be defined as a value which indicates the PCC would be acceptable to operate as a single carrier, e.g., the PCC could be the carrier in single carrier mode. If the quality of the PCC is not good, the method 200 continues to step 210. In step 210, the UE 105 continues to use the carrier aggregation enabled state.

If the quality of the PCC is determined to be good in step 205, the method 200 continues to step 215. In step 215, the carrier aggregation management application 125 determines the data exchange requirements. As discussed above, the carrier aggregation management application 125 may consider the applications that are being executed on the processor 110 that requires the network connection. In step 220, the carrier aggregation management application 125 determines whether the data exchange requirements are low. Again, the term low may be considered to be a relative term. However, the exact amount of data exchange that may be considered to be low may depend on a number of factors, such as the network on which the UE is operating, the geographic location of the UE, etc. Thus, the particular UE vendor or network vendor may determine the level of data exchange that is considered to be low for the purpose of disabling the carrier aggregation functionality. If the data exchange requirements are high, the method 200 continues to step 210 to continue to use the carrier aggregation enabled state.

If the data exchange requirements are low, the method 200 continues to step 225. In step 225, the carrier aggregation management application 125 determines whether the carrier aggregation configuration includes one UL. If only one UL is used, the method 200 continues to step 230. In step 230, the carrier aggregation management application 125 generates an artificial report including the low RSRP, the low RSRQ, and the low PHR values as well as generating the UL report including the UL activity and UL BLER. It should again be noted that the low PHR value may be indicated as negative or positive. However, if positive, the value is a low value in the positive range. In step 235, these reports are transmitted to the network.

When the network receives these reports, the network may determine the two thresholds for activating and deactivating carrier aggregation, specifically based upon the PHR values. Given the low PHR values that were received (and calculated based upon the network configurations), the network may deactivate carrier aggregation for the UE 105.

In step 240, the carrier aggregation management application 125 receives the two thresholds for carrier aggregation activation and deactivation. Based upon these thresholds, the carrier aggregation management application 125 may determine a manner of maintaining transmission activity between these thresholds to maintain the carrier aggregation disabled state. Thus, in step 245, the UE 105 uses the carrier aggregation disabled state.

Returning to step 225, if the carrier aggregation management application 125 determines that there is more than one UL, the method 200 continues to step 250. In step 250, the carrier aggregation management application 125 sets the PHR value to negative for the SCell. As described above, this may be due to the extended PHR being used. Subsequently, the method 200 continues to step 230.

It should again be noted that since the carrier aggregation management application 125 is also aware of the activation threshold for carrier aggregation, the carrier aggregation management application 125 may generate a report with actual values of the above noted parameters. The PHR may also be updated such that the network is caused to reactivate carrier aggregation.

It should also be noted the method 200 may include an additional step relating to the reporting of path loss, particularly to reactivate carrier aggregation. When in the deactivated state, the carrier aggregation management application 125 may report path loss using a value offset by a factor depending on the desire of the UE 105 to have carrier aggregation reactivated.

Figure 3:
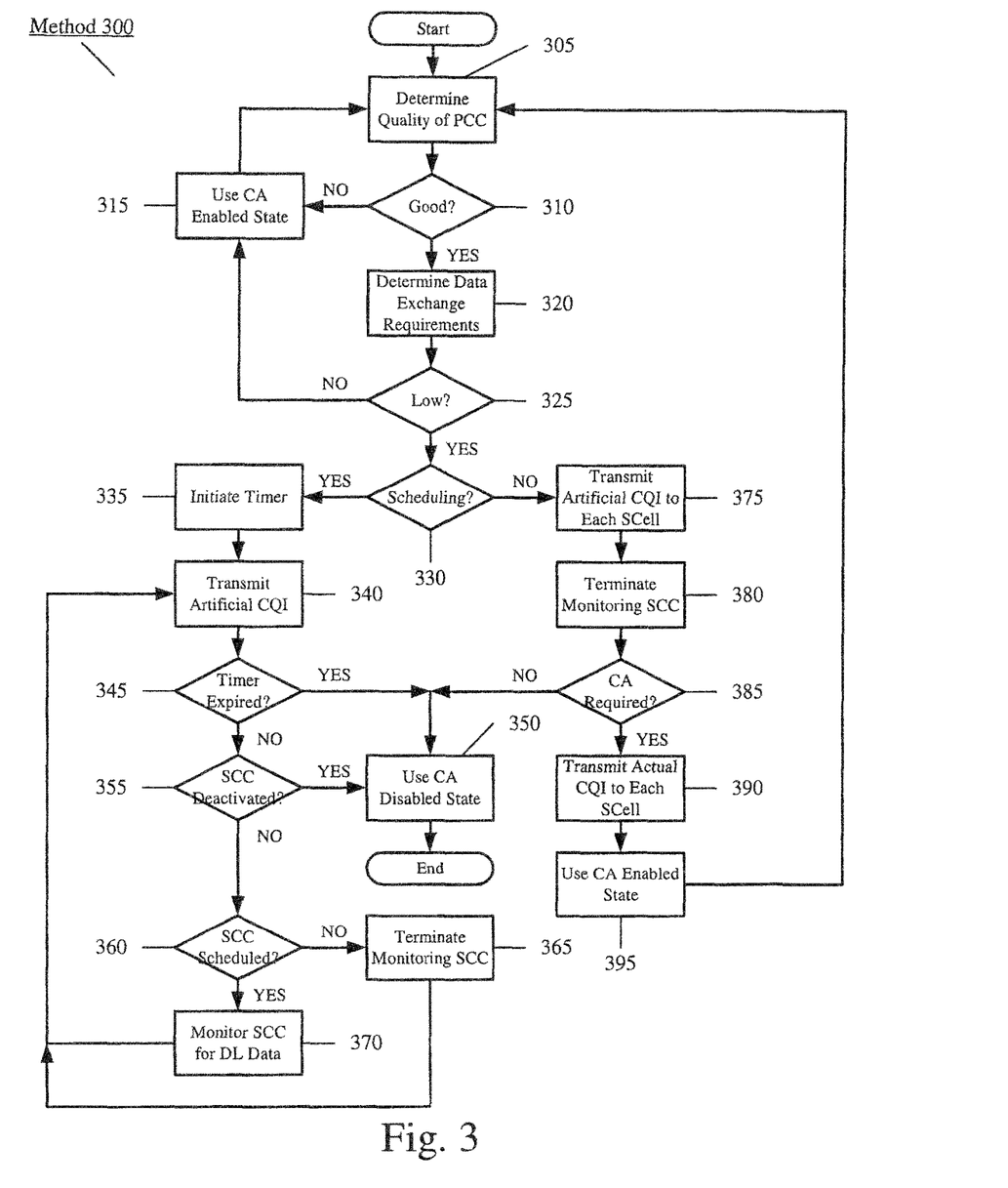
FIG. 3 shows a second exemplary method for a user equipment initiated management of enabling and disabling carrier aggregation.

FIG. 3 shows a second exemplary method 300 for a UE initiated management of enabling and disabling carrier aggregation. In step 305, the carrier aggregation management application 125 determines a quality of the PCC. The quality of the PCC may be determined using any manner such as using a RSSI value. In step 310, the carrier aggregation management application 125 determines if the PCC is qualitatively good. If bad, the method 300 continues to step 315. In step 315, the UE 105 continues to use the carrier aggregation enabled state.

If the PCC is good, the method 300 continues to step 320. In step 320, the carrier aggregation management application 125 determines the data exchange requirements. As discussed above, the carrier aggregation management application 125 may consider the applications that are being executed on the processor 110 that requires the network connection. In step 325, the carrier aggregation management application 125 determines whether the data exchange requirements are low. If the data exchange requirements are high, the method 300 continues to step 315 to use the carrier aggregation enabled state.

If the data exchange requirements are low, the method 300 continues to step 330. In step 330, the carrier aggregation management application 125 determines whether cross-carrier scheduling is enabled. If enabled, the method 300 continues to step 335. In step 335, the carrier aggregation management application 125 initiates the timer used to ensure that subsequent scheduling of SCCs are still addressed.

In step 340, the carrier aggregation management application 125 generates and transmits the artificial CQI for the SCell where the value is set to zero. In step 345, the carrier aggregation management application 125 determines whether the timer has expired. If expired, the method 300 continues to step 350. In step 350, the UE 105 uses the carrier aggregation disabled state.

If the timer is not yet expired as indicated in step 345, the method 300 continues to step 355. In step 355, the carrier aggregation management application 125 determines whether the SCC has been deactivated by the network receiving the CQI of zero. If the SCC has been deactivated, the method 300 continues to step 350. It should be noted that the UE 105 may terminate monitoring the SCC once deactivated.

If the SCC has not yet been deactivated and the timer has not expired, the method 300 continues from step 355 to step 360. In step 360, the carrier aggregation management application 125 determines if the cross-carrier scheduling indicates that the SCC has been scheduled for a data transmission. If the SCC has not been scheduled, the method 300 continues to step 365. In step 365, the carrier aggregation management application 125 terminates monitoring the SCC. The carrier aggregation management application 125 may also continue to transmit the artificial CQI value of zero. If the SCC has been scheduled, the method 300 continues to step 370 where the SCC is monitored for the incoming DL transmission. As discussed above, the monitoring of the SCC may result in the DL on the SCC to be missed at L1. However, a retransmission of the data on the SCC may be received in a following time frame. The method 300 may then return to step 340 after steps 365 or 370.

Returning to step 330, if the carrier aggregation management application 125 determines that cross-carrier scheduling is disabled or unavailable, the method 300 continues to step 375. In step 375, the carrier aggregation management application 125 transmits the artificial CQI of zero to each SCell corresponding to the SCCs. As no cross-carrier scheduling is used, the carrier aggregation management application 125 individually transmits this artificial CQI. In step 380, the carrier aggregation management application 125 terminates the monitoring of the SCC corresponding to the SCells that received the artificial CQI. In step 385, the carrier aggregation management application 125 determines whether carrier aggregation is required. If not required, the method 300 continues to step 350 where the carrier aggregation disabled state is used.

If the carrier aggregation management application 125 determines that carrier aggregation is required, the method 300 continues from step 385 to step 390. In step 390, the carrier aggregation management application 125 transmits actual CQI values (e.g., non-zero values) to each SCell that is to be used in the carrier aggregation configuration. In step 395, the UE 105 uses the carrier aggregation enabled state. With the carrier aggregation state re-enabled, the method 300 may return to step 305.

Figure 4:
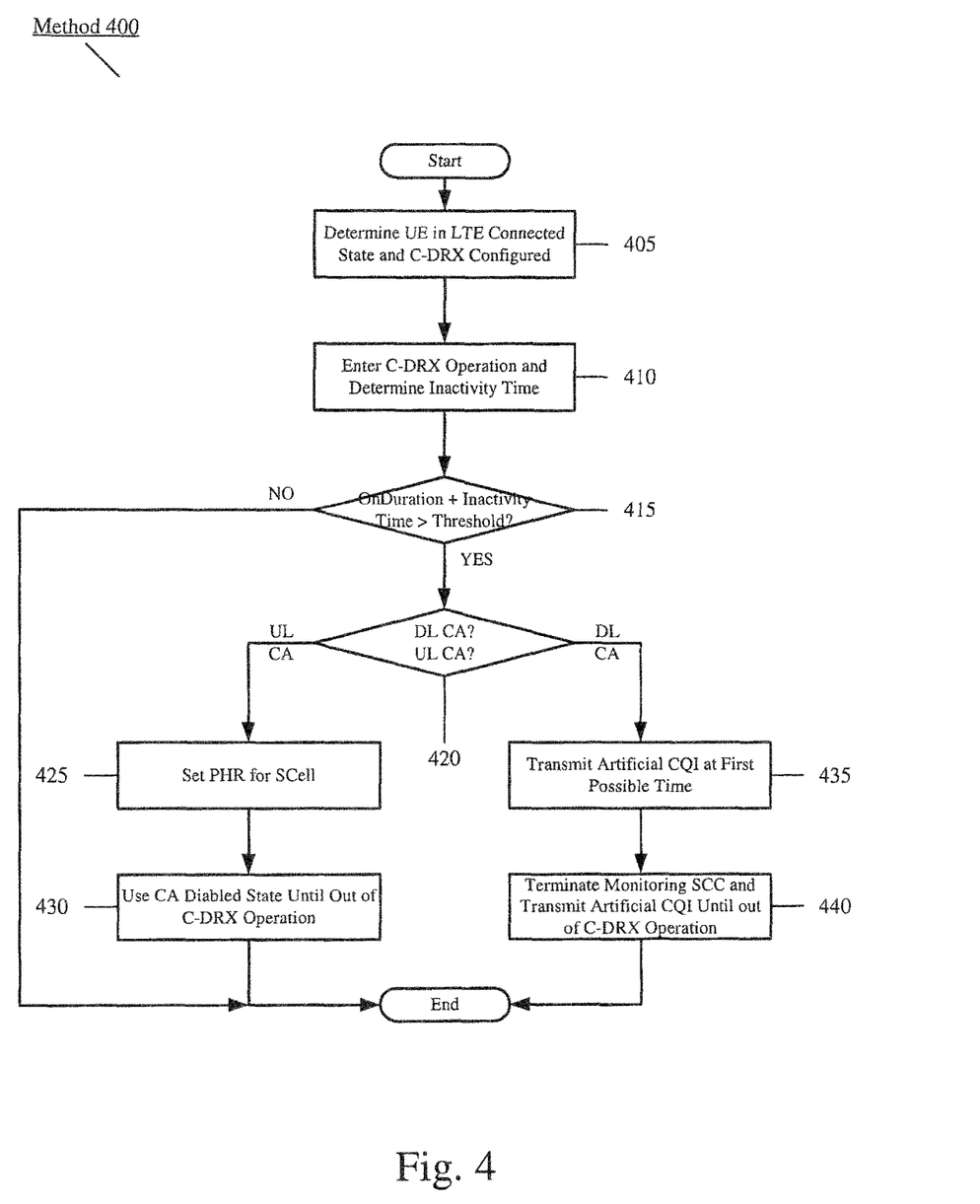
FIG. 4 shows a third exemplary method for a user equipment initiated management of enabling and disabling carrier aggregation.

FIG. 4 shows a third exemplary method 400 for a UE initiated management of enabling and disabling carrier aggregation. Specifically, the method 400 relates to when the US is in an LTE connected state (e.g., Cell_DCH, CELL_FACH, etc.) and also has Connected Discontinuous Reception (C-DRX) configured in which the UE 105 and the eNB 130 negotiate phases for data transfers. Furthermore, the method 400 relates to utilizing the methods 200, 300 described above.

In step 405, the carrier aggregation management application 125 determines that the UE 105 is in the LTE connected state and has C-DRX configured. In step 410, the UE 105 enters the C-DRX operation indicating a schedule for data transmissions. The carrier aggregation management application 125 may also determined a period of inactivity time that the UE 105 has undergone.

In step 415, the carrier aggregation management application 125 determines whether the OnDuration of the C-DRX operation and the inactivity time is greater than a predetermined threshold value. This predetermined threshold value may be set such that the US initiated management process may be performed or not. If the OnDuration and the inactivity time is less than the predetermined threshold value, the method 400 ends. That is, the UE 105 may continue to perform the data transmissions as indicated in the C-DRX configuration.

If the OnDuration and inactivity time is greater than the predetermined threshold, the method 400 continues to step 420. In step 420, the carrier aggregation management application 125 determines whether the UE 105 is in a carrier aggregation enabled state relating to the DL and the UL. If the UL carrier aggregation enabled state is present, the method 400 continues to step 425. If the DL carrier aggregation enabled state is present, the method 400 continues to step 435. Accordingly, if both the UL and DL carrier aggregation enabled states are present, the carrier aggregation management application 125 performs both steps 425, 435.

When the UE 105 has the UL carrier aggregation enabled state, in step 425, the carrier aggregation management application 125 sets a negative PHR for the SCells as described above in step 255 of the method 200. In step 430, the carrier aggregation disabled state is used as described above in step 250 of the method 200. It should be noted that the other steps subsequent to step 255 may also be incorporated into the method 400 such as steps 235-245. The carrier aggregation disabled state may be used until the UE 105 is no longer in the C-DRX operation.

When the UE 105 has the DL carrier aggregation enabled state, in step 435, the carrier aggregation management application 125 transmits the artificial CQI of zero to the network or the corresponding SCell at a first opportunity. Accordingly, this step may be substantially similar to step 340 or 375 of the method 300. In step 440, the carrier aggregation management application 125 terminates the monitoring of the SCC as described above in steps 365, 380 of the method 300. It should be noted that the other steps of the method 300 relating to the transmission of the artificial CQI may also be incorporated into the method 400. The monitoring of the SCC may be reactivated when the UE 105 is no longer in the C-DRX operation.

The exemplary embodiments provide a system and method for a UE initiated process for managing carrier aggregation enabled/disabled states. Specifically, the UE may be in the carrier aggregation enabled state but is simply wasting power since the improved data exchange rate is not required. The UE may include a carrier aggregation management application that is configured to perform different manners of management. In a first manner, the carrier aggregation management application may generate an artificial report including a low RSR P value, a low RSRQ value, and a low PHR. When the network receives this report, the network may be caused to deactivate carrier aggregation for the UE. In a second manner, the carrier aggregation management application may set a CQI value to zero for each SCell such that the SCC corresponding to the SCell may be terminated from being monitored. This may constructively place the UE in the carrier aggregation disabled state.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   at a user equipment (UE) configured to perform carrier aggregation with a network:
   determining a quality requirement for a primary component carrier (PCC) used in a carrier aggregation configuration for a network is greater than a quality threshold and that a data exchange requirement for the UE is below a transmission threshold;
   determining a first artificial value for a powerhead room (PHR) for a secondary component carrier (SCC);
   generating an artificial report including the first artificial value; and
   transmitting the artificial report to a primary cell providing the PCC.

2. The method of claim 1, further comprising:
   receiving, in response to the transmitting the artificial report, an indication that the network has placed the UE in a carrier aggregation disabled state; and
   operating the UE in the carrier aggregation disabled state.

3. The method of claim 1, further comprising:
   determining a second artificial value for a second parameter, wherein the second parameter is one of a received signal received power (RSRP), a Reference Signal Received Quality (RSRQ), a Received Signal Strength Indicator (RSSI) or a combination of two or more of the RSRP, RSRQ and RSSI and wherein the second artificial value is included in the artificial report.

4. The method of claim 2, further comprising:
   determining the UE should be operated in a carrier aggregation enabled state;
   determining a first actual value for the PHR of the SCC;
   generating an actual report including the first actual value; and
   transmitting the actual report to the primary cell.

5. The method of claim 4, further comprising:
   receiving, in response to the transmitting the actual report, an indication that the network has placed the UE in the carrier aggregation enabled state; and
   operating the UE in the carrier aggregation enabled state.

6. The method of claim 2, further comprising:
   measuring a path loss for the SCC; and
   transmitting the path loss measurement to the primary cell.

7. The method of claim 6, further comprising:
   receiving, in response to the transmitting the path loss measurement, an indication that the network has placed the UE in a carrier aggregation enabled state; and
   operating the UE in the carrier aggregation enabled state.

8. The method of claim 1, wherein the first artificial value for the PHR is set to one of zero or a negative value.

9. The method of claim 1, wherein the artificial report serves as a basis for the network to place the UE in a carrier aggregation disabled state.

10. A method, comprising:
    at a user equipment (UE) configured to perform carrier aggregation:
    determining, when the UE is in a carrier aggregation enabled state, that a quality requirement for a primary component carrier (PCC) used in a carrier aggregation configuration for a network is greater than a quality threshold and that a data exchange requirement for the UE is below a transmission threshold;
    determining whether cross carrier scheduling is enabled;
    when cross carrier scheduling is enabled, initiating a timer, wherein when the timer has not expired a secondary component carrier (SCC) is monitored for data transmission.

11. The method of claim 10, wherein, when the timer has expired, using a carrier aggregation disabled state.

12. The method of claim 10, further comprising:
    terminating monitoring of the SCC when the SCC is not scheduled for data transmission.

13. The method of claim 10, wherein when cross carrier scheduling is disabled;
    setting an artificial channel quality indicator (CQI) to zero for each SCC used in the carrier aggregation configuration;
    transmitting the artificial CQI to one of the network and the corresponding secondary serving cell (SCell); and
    terminating monitoring of the SCC.

14. The method of claim 13, further comprising:
    measuring an actual CQI of the SCC;
    transmitting the actual CQI to the network; and
    reinitiating the monitoring of the SCC.

15. A user equipment (UE), comprising:
    a transceiver in communication with a network via a primary cell serving a primary component carrier (PCC);
    a memory arrangement configured to store actual and artificial values for UE operational parameters;
    a processor configured to execute a carrier aggregation management application, the carrier aggregation management application comprising instructions that cause the processor to perform operations comprising:
    determining a quality requirement for the PCC s greater than a quality threshold and that a data exchange requirement for the UE is below a transmission threshold;
    determining, when the UE is in a carrier aggregation enabled state, a first artificial value for a power headroom (PHR) for a secondary component carrier (SCC);
    generating an artificial report including the first artificial value, the artificial report to be transmitted to the primary cell.

16. The UE of claim 15, the operations further comprising:
    receiving, in response to the transmitting the artificial report, an indication that the network has placed the UE in a carrier aggregation disabled state; and
    operating the UE in a carrier aggregation disabled state.

17. The UE of claim 15, wherein the primary cell is an evolved Node B (eNB) and the network is a Long Term Evolution (LTE) network.

18. The UE of claim 15, the operations further comprising:

determining a second artificial value for a second parameter, wherein the second parameter is one of a received signal received power (RSRP), a Reference Signal Received Quality (RSRQ), a Received Signal Strength Indicator (RSSI) or a combination of two or more of the RSRP, RSRQ and RSSI and wherein the second artificial value is included in the artificial report.

19. The UE of claim 16, the operations further comprising:
   determining the UE should be operated in a carrier aggregation enabled state;
   determining a first actual value for the PHR;
   generating an actual report including the first actual value, the actual report be transmitted to the primary cell.

20. The UE of claim 19, the operations further comprising:
   receiving, in response to the transmitting the actual report, an indication that the network has placed the UE in the carrier aggregation enabled state; and
   operating the UE in the carrier aggregation enabled state.

* * * * *